Patented Feb. 10, 1953

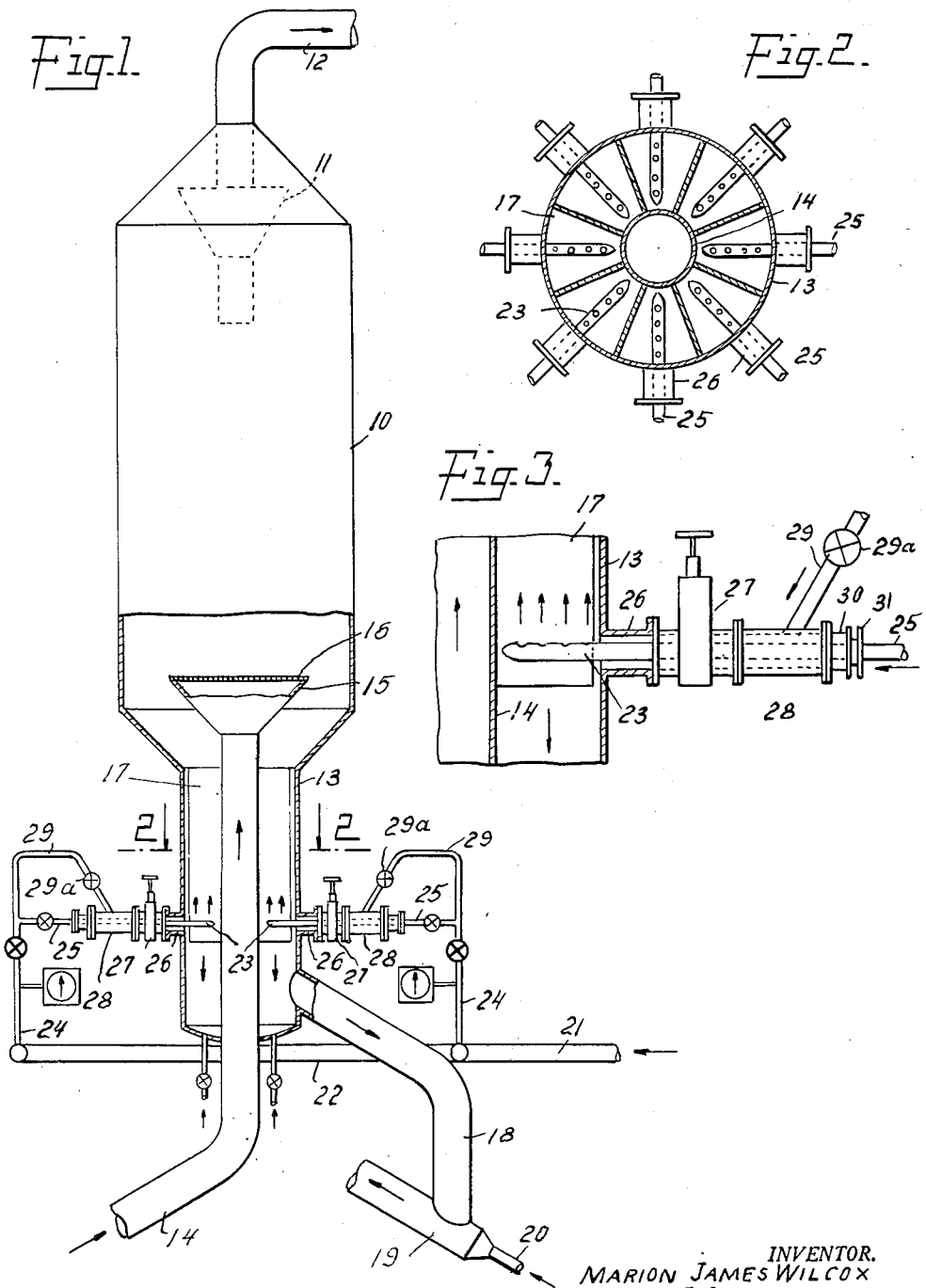

2,628,158

UNITED STATES PATENT OFFICE 2,628,158

CATALYST STRIPPING VESSEL

Marion James Wilcox, Harvey, Ill., and Elmer F. Schade, Highland, Ind., assignors to Sinclair Refining Company, New York, N. Y., a corporation of Maine Application March 6, 1950, Serial No. 147,908

2 Claims. (Cl. 23—288)

Our invention relates to improvements in the spent catalyst stripping section of hydrocarbon cracking units employing finely divided solid catalysts. In hydrocarbon cracking units employing finely divided solid catalysts, for example fluid catalyst cracking units, the catalyst in use is circulated cyclically from reaction zone to regeneration zone. Prior to regeneration of the catalyst by burning off carbon deposited on its surfaces, it is customary to contact the spent catalyst from the reaction zone with a hot, high pressure gas or vapor in order to strip out entrained and adsorbed hydrocarbons. Quite often the stripping section is located directly below the reaction vessel of which it may form an integral part as a well or sump-like lower structure. Spent catalyst from the catalyst bed maintained in the reaction vessel gravitates at a high rate, e. g. 15 to 20 tons per minute for a typical 25,000 barrel per day unit, through the stripping vessel in countercurrent contact with the stripping medium, usually high temperature steam. The stripping steam is ordinarily injected into the stream of spent catalyst by means of upturned injection nozzles, and to obtain uniform distribution, several nozzles are used, usually linked to a single steam supply pipe in the form of a web or spider.

We have found that considerable difficulty is developed in the conventional stripping section through catalyst erosion of the steam injection nozzles. Stripping efficiency is disturbed, and ultimately serious erosion of the internal surfaces of the stripping section results. Apparently, catalyst drops into the nozzle openings where erosion occurs and is whipped out of nozzles having higher velocity so that the elbows for the upturned nozzles are cut away until a steam blast with entrained catalyst is directed horizontally upon the internal surfaces of the stripping vessel. This difficulty is particularly pronounced in stripping vessels of the type where the reaction charge mixture enters the reaction vessel by means of an internal riser up through the stripping vessel forming a surrounding annulus in which spent catalyst stripping is effected. In this type stripping vessel, we have found that nozzle erosion may result in holes being cut entirely through the reactor riser pipe so that proper stripping efficiency and catalyst circulation is seriously interfered with.

In accordance with our invention, we provide retractable tubular steam lances inserted through a wall of the stripping well so that the lances are horizontally disposed across its internal cross-section. A plurality of restriction orifices are distributed in the upper surface of each lance or pipe connection in order to effect upward distribution of steam more or less uniformly across the internal cross-section of the vessel. By restriction orifice, we mean that the orifices are sized to discharge steam at a predetermined flow rate. The orifice size is selected in accordance with the diameter of the steam lance and the supply and the pressure of the steam at maximum discharge for the pressure conditions obtaining across the orifice. In this way we are able to make steam flow independent of variations in internal pressure of the stripping vessel. Thus the pressure in the stripping vessel throughout the operating range by design of the steam lance and orifices is less than the critical ratio of the pressure in the orifice throat to the supply pressure. For superheated steam, the stripper absolute pressure must be less than 55 per cent of the initial absolute pressure of the supply system, and then steam flow through the orifice nozzles will depend only upon the area of the orifice and upon the steam supply pressure. According to our invention, we provide flow metering means outside the stripping vessel for determining variation in the flow of stripping steam from the steam supply lances. We have found that when the lances erode and the orifices enlarge, more steam is automatically delivered to the stripping vessel. Thus the metering means provides direct warning of the occurrence of erosion so that the retractable lance in question may be removed and replaced before operation of the unit is disturbed.

The terms "metering" and "metered" as used in this specification are intended to describe measuring means which are responsive to the rate of steam flow for indicating the rate of steam flow through the orifices of the steam lances.

Our invention will be further described by reference to the accompanying schematic drawings. Figure I represents a sketch of the reactor of a commercial fluid catalyst cracking unit with a lower stripping well shown in section with retractable steam lances in position. Figure II is a horizontal section taken across the lines 2—2 of Figure I. Figure III represents an enlarged and diagrammatic view of a portion of the stripping annulus of the stripping vessel showing the structure of the retractable steam lance and its mounting in greater detail.

In Figure I the equipment shown includes reaction vessel 10 with internal cyclone section 11 and overhead vapor line 12. Stripping vessel 13 constitutes a well below reaction vessel 10 proper.

Reactor riser 14 rises vertically up through the stripping vessel 13 and ends in a cone discharge section 15 surmounted by perforated grid 16. Spent catalyst gravitating from the usual reaction bed in reaction vessel 10 descends through annulus 17 of stripping vessel 13 to drop-out line 18 which discharges into the regenerator riser 19 where the catalyst stream is picked up by carrier air injected at 20. High temperature stripping steam is supplied through line 21 to manifold 22 from which it is delivered to the individual steam lances 23 through connections 24 and 25.

By reference to Figure II, it is seen that steam lances 23 are each provided with a plurality of orifices or discharge openings distributed in the upper surface so that stripping steam is discharged upwardly into the annulus 17 of the stripping vessel 13.

By reference to Figure III it may be seen that each steam lance 23 is mounted and sealed in the wall of the stripping vessel 13 in such a way that it can be readily retracted during normal operation of the unit without necessity of shutdown. The lance 23 and connection 25 are inserted through a flanged fixture 26 welded to a wall of vessel 13. A gate valve 27 is bolted to flanged fixture 26 and to the gate valve 27 is affixed an additional pipe section 28 equipped with an aeration steam line 29 and a packing gland 30 and fitting 31 for use in retracting the steam lance 23. The fitting 31 is loosened and the steam lance is withdrawn until gate-valve 27 can be closed. The steam lance 23 is removed and disconnected from connection 25. Replacement is provided by inserting the new lance into pipe section 28 and tightening fitting 31. Valve 27 is opened and aeration steam is turned into line 29 by opening valve 29a in order to free the line of catalyst particles as the steam lance is placed in position and fitting 31 is adjusted to provide a vapor tight connection.

Hence our invention provides an improved system for distributing stripping steam in the stripping vessel of a catalytic cracking unit employing a finely divided catalyst. Retractable steam lances are provided which can be removed when erosion causes a loss in stripping efficiency. The injection orifices in the steam lances are sized to admit the quantity of steam desired so that proper distribution of stripping steam is insured throughout the length of the perforated portion of the lance. Employing equi-sized ejection orifices, the internal diameter of the lance advantageously may be progressively reduced in size from steam source to tip in order to prevent maldistribution of steam by excessive discharge through the outer orifices. The restricting pressure drop is taken at the point of distribution so that entry of the catalyst into the distributing lance is prevented and erosive "sandblast" effects upon the internal surfaces of the stripping vessel are eliminated. The total stripping steam is metered so that an increase in the amount of steam delivered to the stripping vessel provides an indication of internal erosion which can be confirmed by simple inspection without unit shutdown in order to make the necessary replacement. In addition to reducing maintenance charges against equipment and insuring against undue steam consumption, our invention safeguards against significant conversion drops due to loss in stripping efficiency when the unit is operating at high oil throughput and maximum coke burning capacity in the regenerator.

We claim:

1. In a spent catalyst stripping vessel of a hydrocarbon cracking unit employing finely divided solid catalyst, a plurality of steam injection means each comprising a gate valve having the flange of one opening connected to said vessel in fluid communication therewith, a pipe section connected at its inner end to the flange of the other opening of said gate valve, a packing gland and fitting means adjustably connected to the outer end of said pipe section, a steam lance mounted at its outer end in said packing gland and fitting means and sealably engaged thereby, said steam lance extending inwardly to said stripping vessel and horizontally across its internal cross section, said steam lance having a plurality of restricted orifices in the upper surface thereof sized to discharge steam at a predetermined flow rate to insure proper distribution of steam and prevent the entry of said catalyst therein, and a plurality of means each being connected to its respective steam injection means responsive to the rate of steam flow for indicating the enlargement of said orifices due to erosion to insure replacement of its respective lance during continuous operation of said vessel prior to excessive steam consumption and damaging erosion.

2. In a spent catalyst stripping vessel of a hydrocarbon cracking unit employing finely divided solid catalyst where the vessel is of the type having an internal riser through which the reaction charge mixture rises and a surrounding annulus through which the spent catalyst descends, a plurality of steam injection means each comprising a gate valve having the flange of one opening connected to said vessel in fluid communication therewith, a pipe section connected at its inner end to the flange of the other opening of said gate valve, a packing gland and fitting means adjustably connected to the outer end of said pipe section, a steam lance mounted at its outer end in said packing gland and fitting means and sealably engaged thereby, said steam lance extending inwardly to said stripping vessel and horizontally across said surrounding annulus, said steam lance having a plurality of restricted orifices in the upper surface thereof sized to discharge steam at a predetermined flow rate to insure proper distribution of steam and prevent the entry of catalyst therein, and a plurality of means each being connected to its respective steam injection means responsive to the rate of steam flow for indicating the enlargement of said orifices due to erosion to insure replacement of its respective lance during continuous operation of said vessel prior to excessive steam consumption and damaging erosion.

MARION JAMES WILCOX.
ELMER F. SCHADE.

REFERENCES CITED

The following references are of record in the file of this patent:

UNITED STATES PATENTS

| Number | Name | Date |
|---|---|---|
| 477,909 | Meier et al. | June 28, 1892 |
| 1,955,914 | Baker et al. | Mar. 26, 1935 |
| 2,431,630 | Arveson | Nov. 25, 1947 |
| 2,491,536 | Tyson | Dec. 20, 1949 |
| 2,525,925 | Marshall | Oct. 17, 1950 |